Figure 1:
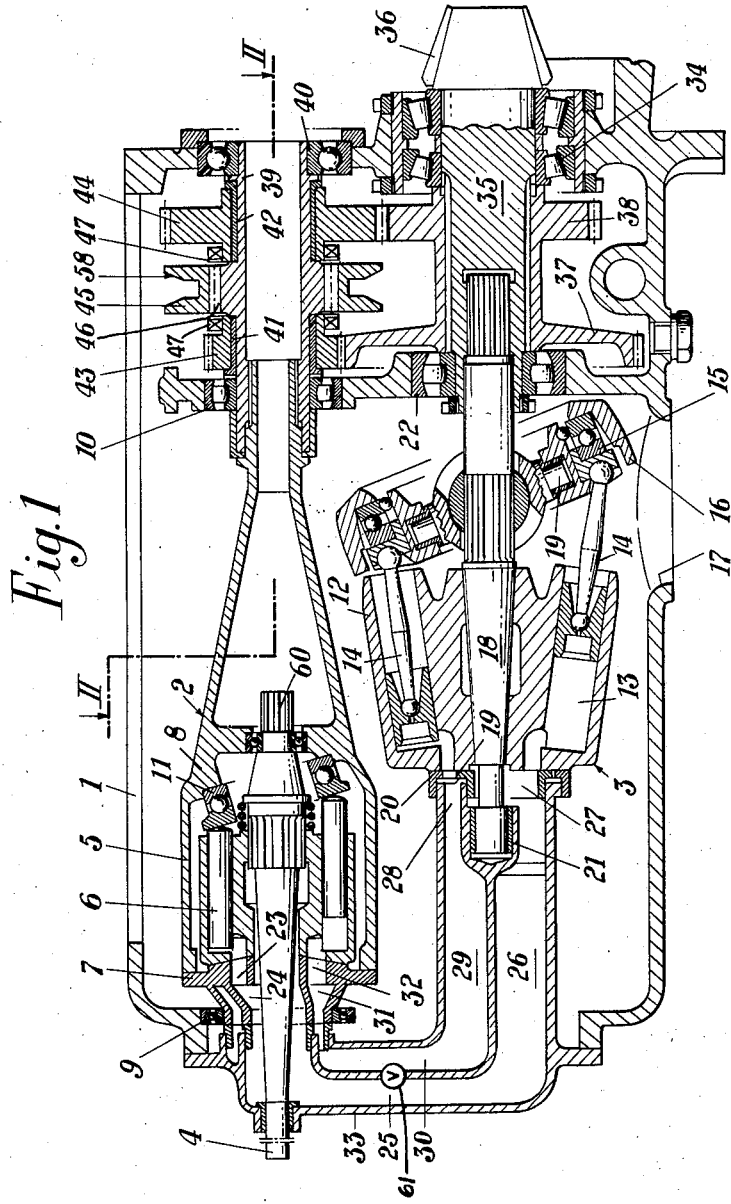

June 23, 1959  G. BADALINI  2,891,419
HYDRAULIC TRANSMISSION
Filed Nov. 21, 1955  2 Sheets-Sheet 1

INVENTOR
GIOVANNI BADALINI

BY
ATTORNEYS

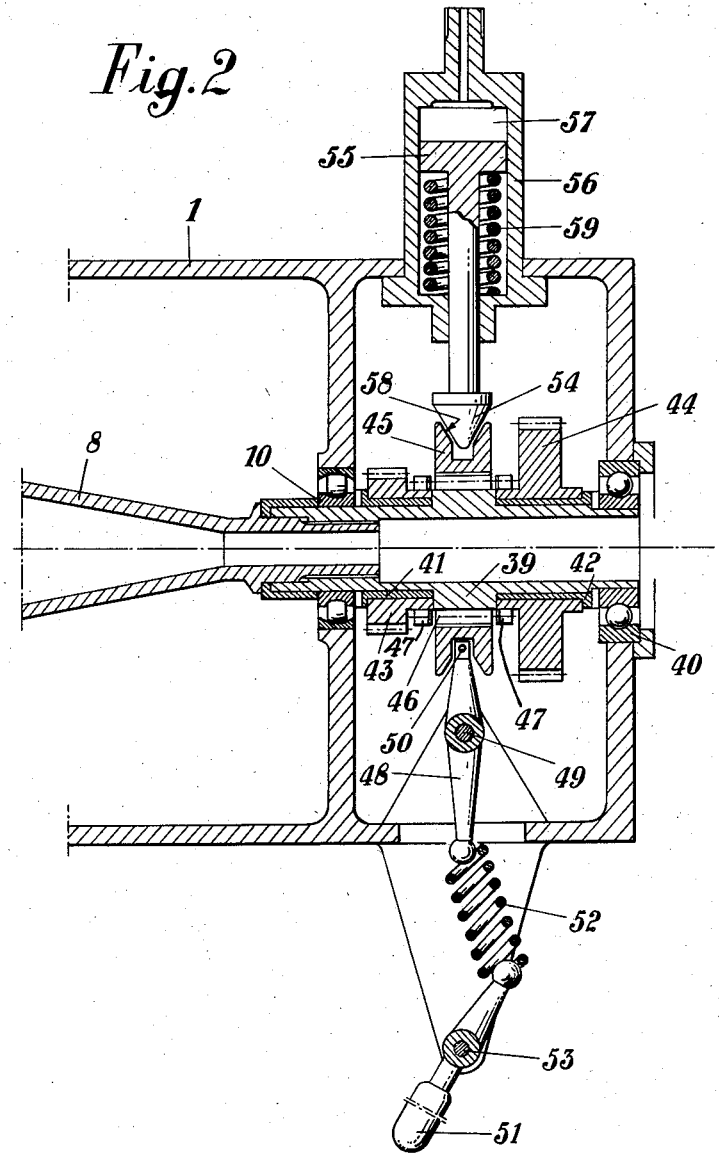

United States Patent Office 2,891,419
Patented June 23, 1959

2,891,419

HYDRAULIC TRANSMISSION

Giovanni Badalini, Rome, Italy, assignor to S.p.A. Cambi Idraulici Badalini, Rome, Italy, a company of Italy Application November 21, 1955, Serial No. 548,177

Claims priority, application Italy December 10, 1954

3 Claims. (Cl. 74—687)

The present invention relates to a hydraulic transmission affording a continuous change of the drive ratios, this transmission being particularly for motor vehicles.

The purpose of the present invention is to permit the continuous change of the drive ratio between a driving shaft and a driven shaft, in a range of low speeds, as well as within a range of speeds which begins from about the same minimum speed, and reaches rather high values, yet still maintaining a good efficiency for all of the values of the drive ratio, regardless of the value of the speed.

The above mentioned purpose is embodied in the present invention which comprises a hydraulic transmission in which the power is transmitted from the driving shaft to the driven shaft in parallel by a transmission comprising a pump and a motor, both of which are piston devices, connected in a closed circuit, and by another transmission, for instance a toothed gearing, tending to restore to the driven shaft the reaction torque produced within the pump. Both said pump and said hydraulic engine are of the piston type, controlled by an inclined plate. The pump is operated by the driving shaft, while its casing and the inclined plate fixed thereto are mechanically connected to the driven shaft by at least two different drive ratios. The hydraulic motor is operated by said pump and acts upon said driven shaft. At least one of the control plates, either that of the motor or that of the pump is tiltable to different positions in order to obtain a continuous variation of the volumetric displacement and therefore of the rotational speed within a speed range possible with one of said drive ratios.

One preferred form of this invention is shown in the attached drawings, wherein:

Fig. 1 is an axial sectional view of the hydraulic transmission according to this invention, and Fig. 2 is a detailed cross-sectional view of the device, taken on the line II—II of Fig. 1 and showing the mechanism for changing the speed ratio between the primary shaft and the secondary shaft.

Referring now to the drawings, within an outer casing 1 of the hydraulic transmission are contained both the pump unit 2 and the hydraulic motor 3. The driving or primary shaft 4 of the transmission rotates the body 5 of the pump, within which slide the pistons 6. The body 5 rests on the distributing plate 7 which is fixed to the casing 8 of the pump which encloses all of the elements of said pump and is freely rotatable about the axis of said pump, being supported by the supports 9 and 10. Also fixed to the casing 8 is a plate with a ball bearing 11 inclined with respect to the axis of the casing 8, and on said bearing rest the pistons 6 of the pump so that due to the relative rotational movement of the body 5 with respect to the casing 8, said support 11 causes the reciprocation of the pistons 6 and thereby the operation of the pump. The hydraulic motor 3, the operation of which is similar to that of the pump 2 is arranged on an axis parallel to the primary shaft 4. In said motor 3, the body 12 is secured to shaft 18 and supports the pistons 13 which are slidably mounted therein and which exert their thrust on the ball bearing 15 mounted in the tiltable plate 16 through connecting rods 14. The tiltable plate 16 can be tilted about an axis at right angles to the plane of the drawing, this axis being stationary relative to the casing 1. The inclinations of the plate 16 are controlled from the outside of the casing by any system through the aperture 17 of the casing 1. The torque produced by the thrust of the connecting rods 14 on the tiltable plate 16 of the bearing 15 is transmitted to the shaft 18 by the universal joint 19. At the side of the body 12 opposite to the plate 16 the rings 19 and 20 rest on body 12 and act to distribute the fluid coming from inside the pump 2 to inside the body 12.

The shaft 18 is supported on one end by the front support 21 and on the other end by the rear support 22, the front support being fixed to the cover plate 33, while the rear support is fixed to the casing 1. The pump 2 and the motor 3 are hydraulically interconnected and in particular the port in the outlet 23 of the distributing plate 7 of the pump is connected through the ducts 24, 25 and 26 to the suction chamber 27 of the motor, while the outlet chamber 28 of the motor is connected through the ducts 29, 30 and 31 to the suction port 32 of the pump. The ducts 25 and 30 extend through a cover plate 33 for the end of the casing 1.

The shaft 35 or secondary shaft of the transmission is in alignment with the shaft 18 of the hydraulic motor 3, said shaft 35 being supported by the bearings 22 and 34. The shaft 35 rotates with the shaft 18 and carries at its outer end a power take-off member 36.

The two gears 37 and 38 are mounted on the shaft 35. The casing 8 of the pump 2 rotates the hollow shaft 39 which is in alignment with said casing. The shaft 39 is supported by the bearings 10 and 40 and two gears 43 and 44, mounted on two bushings 41 and 42 are freely rotatable thereon. These gears are meshed with the gears 37 and 38, respectively. On the shaft 39, intermediate the gears 43 and 44 is splined the sleeve 45 which can slide along said shaft 39, said sleeve being provided with teeth 46 for meshing with the front teeth 47 provided in the gears 43 and 44 respectively after sleeve 45 has moved in one direction or the other. In this way, by axially displacing the sleeve 45 on the shaft 39 it is possible to engage either of the gears 43 or 44 causing them to revolve together with the shaft 39 and therefore, through the gears 37 and 38 with the secondary shaft 35 of the transmission.

The sleeve 45 is controlled by the fork member 48 pivoted at 49 and engaging the sleeve by means of the sliders 50 (Fig. 2). The member 48 is controlled by the lever 51 by means of the spring 52. One end of the spring 52 is fixed to the arm of the member 48, while the other end of the spring is fixed to the lever 51 which is pivoted at 53. When the lever 51 is displaced, the spring is pre-set for urging the member 48 and therefore the sleeve 45 in either direction.

A conical member 54 enters a circular conical-walled groove 58 in the sleeve 45, and overcoming the action of the spring 52, disengages the sleeve 45 from the gears 43 or 44 and blocks said sleeve after having carried it to a central position with respect to said gears, i.e. to a neutral position. The conical member 54 is connected to the piston 55 slidable within a cylinder 56. Under the action of the fluid pressure which can enter the chamber 57 of the cylinder 56, the piston 55, and therefore the conical member 54 may move forwards to engage in the groove 58 of the sleeve 45. A spring 59 moves the piston 55 back as soon as the action of the fluid within the chamber 57 has ceased, disengaging the sleeve 45, and rendering its movement under the action of the spring 42 by sliding on the shaft 39 possible, said spring 52 already being pre-set for its desired direction of action.

The inclined support 11 of the pump 2, instead of being arranged in a fixed inclined position, can be movable like the tiltable plate 16 of the motor 3, if said support is pivoted on the casing 8, so as to cause the volumetric displacement to change from zero to a maximum value. The pinion 60 is provided to make available a power take-off for auxiliary gears such as lift arms on a winch.

Operation

When the primary shaft of the transmission 4 and therefore the body 5 are revolved, the fluid which is displaced by the pump 2, tends to flow within the motor 3, causing the motor 3 to operate.

The amount of fluid passing from the pump to the motor is proportional to the volumetric displacement of the motor 3 (i.e. to the inclination of the tiltable plate 16) as well as to the ratio between the rotational speeds of the casing 8 and of the shaft 35, according to which of the pairs of gears 37—43 or 38—44 is operative (due to the position of the sleeve 45). By moving the plate 16 from its position at right angles to the shaft 35 to its position of maximum inclination, the volumetric displacement of the motor 3 will also change; when the plate 16 is at right angles to the axis of rotation axis (zero volumetric displacement of the motor) no fluid will flow, thus forming a hydraulic coupling in which the pump cannot send fluid to the motor (as this latter has zero volumetric displacement) and will transmit the movement to the casing 8, like a common hydrostatic coupling.

The rotational speed of the secondary shaft 35 will be different according to which of the ratios, either 37—43, or 38—44, is engaged. More particularly, if the ratio 37—43 is greater than the ratio 38—44, the rotational speed of the shaft 35 will be less with the ratio 37—43 than with the ratio 38—44.

If the ratio 37—43 is called $r'$, and the ratio 38—44 is called $r''$, when the plate 16 of the motor is at right angles to the shaft 35, a "low speed drive" will be obtained by the ratio $r'$, while a "high speed drive" will be obtained by the ratio $r''$.

When the plate 16 is arranged in its position of maximum inclination, the operating pressure within the circuit is that determined by the pump 2, i.e. by its volumetric displacement, as well as by the torque applied to the primary shaft 4. The torque is constant, as commonly occurs, and as the volumetric displacement of the pump is constant, a constant pressure of the fluid will be obtained in the chamber of the cylinders 13 of the motor 3, during their power stroke. The motor 3 will exert, therefore, a rotational torque on the secondary shaft which is proportional to the constant inclination of the plate 16, regardless of the insertion either of the ratio $r'$ or of the ratio $r''$. On the shaft 35, in addition to the torque due to the hydraulic motor 3, there is also imposed the reaction torque of the pump 2, afforded by the rotary casing 8. Therefore, according to the ratio which is engaged, i.e. either $r'$ or $r''$, to the shaft 35 are added both the torque of the motor 3 and the reaction torque of the pump 2, this latter torque being multiplied by the reciprocal of the ratio, either $r'$ or $r''$.

The reaction torque of the pump is transmitted to the driven shaft through one of the gear transmissions 37—43 or 38—44. The greater the reduction ratio is, the less the reaction torque from the pump will be on the driven shaft. The total reduction R which is obtained, can be expressed by the formula:

$$\frac{1}{R}=\frac{1}{r}\left(\frac{Cm}{\tfrac{1}{2}Cp}+1\right)$$

where:

R is the total reduction ratio;

$r$ is the reduction ratio of the engaged gears (either 37—43 or 38—44)

$Cm$ is the volumetric displacement of the motor;

$Cp$ is the volumetric displacement of the pump.

The above noted formula shows that the greater the reduction $r$, the lower will be the maximum speed, while the reduction of the minimum speed is slight. Therefore, even if a very high maximum speed is desired, i.e. when the motor 3 has a volumetric displacement equal to zero, with a unitary or a multiplying ratio in engagement), a rather limited minimum speed will be always obtained (the motor 3 having its maximum volumetric displacement) and consequently a very wide range of ratios. Conversely, if a great ratio $r$ is inserted, when the volumetric displacement of the motor 3 varies from zero to its maximum value, the range of speeds is reduced but the maximum speed is greater than the preceeding one, while there is only a slight diminution of the minimum speed.

The efficiency of the devices for changing the speed where the reaction torques due to the inclined plate of the pump are transmitted to a driven shaft of the type according to this invention, shows a trend which decreases with the increase of the reduction ratio, i.e. with the increase of the volumetric displacement of the motor (inclination of the plate).

The vehicle equipped with a transmission according to this invention can travel at low speed if either the drive ratio $r''$ or the drive ratio $r'$ is engaged. However in the latter case the reduction between the primary shaft 4 and the secondary shaft 35 is partially obtained by mechanical means and partially by hydraulic means, while in the first case (assuming $r''$ to be 1:1) the reduction between the primary shaft 4 and the secondary shaft 35 is obtained only by hydraulic means.

The greater is the mechanical reduction $r$, the less is the effective operating reduction of the hydraulic part of the transmission and therefore the better are the operating conditions of the device and the associated efficiency.

The importance of the above result relates mainly to the application of the transmission according to this invention to agricultural and industrial tractors in which often the greatest portion of the work is carried out at very low speeds, a high speed being however indispensable for the travels of the vehicle on roads or for light work, when however it is always indispensable to have available a high starting power on broken ground where the vehicle may have to move.

Another advantage can be found in that there always passes through the gear transmission (either 37—43 or 38—44) the torque associated with the primary shaft 4 of the transmission, while the greater torque (i.e. the torque transmitted by the hydraulic motor) is directly transmitted to the secondary shaft 35. It is obvious that in these types of transmissions, in comparison with the common transmissions having two parallel shafts as used on the vehicles of the above mentioned type, and wherein all of the power is transmitted from one or the other of the shafts, there is a reduced power loss in the mechanical transmission.

By the device shown in fig. 2, it is obvious that either the low speed or the high speed for the vehicle may be pre-set by the displacement of the lever 51, in that the spring 52 due to the pre-setting of the lever 51 thrusts the sleeve 45 towards the gears 43 or 44, as aforesaid.

This operation can occur only when the member 54 is not engaged within the groove 58.

When a control fluid under pressure is sent to the chamber 57 of the cylinder 56, due to the forward movement of the piston 55, the conical member 54 enters the groove 58 of the sleeve 45 and causes the teeth 46 and 47 to disengage, rendering the primary shaft 4 idle with respect to the secondary shaft 35. Moreover, as the member 54 is pressed against the groove of the sleeve 45 by the pressure prevailing at 57, the sleeve 45 is blocked and the rotary body 8 of the pump 2 is in turn blocked by the sleeve. Under these conditions there is no longer a transmission where the reaction torque due to the inclined plate of the pump is transmitted to the driven shaft, but only a piston-pump hydraulic transmission where the whole power of the main engine of the vehicle is transformed to hydraulic power by said pump 2, said hydraulic power being again totally transformed to mechanical power by the motor 3, in that the shaft 35 is connected only to the motor 3.

Under these conditions, if the plate 16 of the motor 3 is inclined in the direction opposite to that shown at Fig. 1, the condition of reverse drive will be obtained.

The reverse drive efficiency will therefore be that of a common transmission comprising piston pumps and a motor. The advantage of this solution is evident in that for the reverse drive of a transmission wherein the reaction torque of the inclined plate of the pump is transmitted to the driving shaft, it is necessary for the motor 3 to produce a torque contrary to the reaction torque of the pump 2, and therefore the torque on the secondary shaft will be the difference between the torque of the motor 3 and that of the pump 2 (it is to be noted that in the forward drive there the advantage is that the total is the sum of the torque). When the plate of the motor is arranged at its maximum inclination, the maximum reduction ratio is obtained; if this ratio is to be reduced up to the limit of the idle drive (1:∞) it is necessary to predispose a valve 61 between the ducts 25 and 30 so that the fluid can be short-circuited. If the ball bearing 11 is also mounted on a titlable plate, the same result can be obtained by diminishing the inclination of said bearing until the idle drive is reached when the bearing is at right angles to the rotating shaft of the pump.

Also, the transmission according to this invention is provided with a pump (not shown) inserted in the circuit of the fluid, the function of which is to keep the fluid under a slight pressure so as to compel the suction pistons of the pump 2 to make their return stroke.

I claim:

1. A combined hydraulic transmission device and a mechanical change speed gear for motor vehicles, particularly agricultural and industrial tractors, which comprises in combination an outer stationary housing, a driving shaft and a driven shaft parallel thereto, a multicylinder hydraulic pump and a multicylinder hydraulic motor both contained in the said stationary housing and hydraulically interconnected in a closed circuit, said hydraulic pump having a cylinder body mounted on the driving shaft and rotated thereby and a rotatable casing provided at one end with an extension and having therein an inclined abutting surface, a distributing plate fastened to the pump casing against which said cylinder body abuts, a plurality of pistons reciprocable in said pump cylinder body and rotatably abutting the said inclined surface of the pump casing, said hydraulic motor having a cylinder body mounted on said driven shaft, a plurality of pistons reciprocating in said motor cylinder body, a wobble plate mounted on the said driven shaft, said pistons abutting against said wobble plate, two distributor rings for the liquid coming from the pump against which said motor cylinder body abuts at the end opposite to the pistons, a hollow shaft coaxially fastened to the said extension of the pump casing and rotatable with said casing, at least two gears idly mounted on the said hollow shaft an at least two gears rigidly fastened to the driven shaft and engaging with the said hollow shaft gears, a sleeve slidably mounted on said hollow shaft between said hollow shaft gears and having at its periphery a circular groove having inclined sides, said sleeve having teeth thereon and said hollow shaft gears having teeth engageable with the teeth on said hollow shaft gears, and means for sliding said sleeve to selectively engage either of said hollow shaft gears.

2. A device as claimed in claim 1, which further comprises a fork lever pivoted at an intermediate position thereof inside the stationary housing, a second hand operable lever pivoted outside the said stationary housing and arranged in operative relation with respect to the fork lever, a spiral spring interposed between said fork lever and said second lever and operatively connected thereto to transmit to the fork lever a pivoting movement controlled by said second lever, said fork lever having the end opposite to the spiral spring associated therewith in continuous engagement with the circular groove of the said sleeve mounted on the hollow shaft to slide said sleeve in either direction to bring the sleeve into engagement with either said hollow shaft gears, a cylinder arranged on the stationary housing at a position opposite to said second lever, said cylinder having a piston therein, said piston being provided with a stem ending in a conical head for engagement with said circular groove of said sleeve, a spring mounted on the said piston stem urging said conical head to a position removed from engagement with said circular groove of said sleeve, and fluid pressure means connected to said cylinder for moving said piston, whereby movement of said piston against the action of the said spiral spring brings said conical head into engagement with the said circular groove of the sleeve and said sleeve is disengaged from both of said hollow shaft gears and brought to an intermediate inoperative position.

3. A combined transmission device and mechanical change speed gear comprising in combination a driving shaft, a driven shaft, a multicylinder hydraulic pump on said driving shaft, a multicylinder hydraulic motor on said driven shaft, said hydraulic pump and hydraulic motor being hydraulically interconnected, a further shaft mounted on said hydraulic pump and driven thereby, a plurality of gears loosely mounted on said further shaft, a plurality of gears on said driven shaft in mesh with said gears on said further shaft, and means on said further shaft for selectively connecting said further shaft and one of said gears loosely mounted thereon for rotation together.

References Cited in the file of this patent
UNITED STATES PATENTS 1,840,872     Rayburn _____ Jan. 12, 1932